US006532237B1

(12) United States Patent
Or et al.

(10) Patent No.: US 6,532,237 B1
(45) Date of Patent: Mar. 11, 2003

(54) APPARATUS FOR AND METHOD OF TESTING A HIERARCHICAL PNNI BASED ATM NETWORK

(75) Inventors: Alexander Or, Nesher (IL); Haim Rochberger, Netanya (IL); Ken Benstead, Shrewsbury, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/250,713

(22) Filed: Feb. 16, 1999

(51) Int. Cl.[7] .......................... H04L 12/28; H04L 12/56
(52) U.S. Cl. ..................... 370/396; 370/250; 370/360; 370/389; 370/400; 370/410; 370/905
(58) Field of Search ................................. 370/241, 242, 370/244, 248, 250, 252, 254, 255, 351, 389, 395.1, 395.51, 395.53, 396, 398, 400, 410, 905; 379/1.01, 901

(56) References Cited

U.S. PATENT DOCUMENTS

| | | | |
|---|---|---|---|
| 4,823,338 A | | 4/1989 | Chan et al. |
| 4,975,906 A | | 12/1990 | Takiyasu et al. |
| 5,214,646 A | | 5/1993 | Yacoby |
| 5,226,041 A | * | 7/1993 | Waclawsky et al. .......... 370/60 |
| 5,280,476 A | | 1/1994 | Kojima et al. |
| 5,280,481 A | | 1/1994 | Chang et al. |
| 5,315,582 A | | 5/1994 | Morizono et al. |
| 5,321,693 A | | 6/1994 | Perlman |
| 5,321,694 A | | 6/1994 | Chang et al. |

(List continued on next page.)

FOREIGN PATENT DOCUMENTS

| WO | WO97/04386 | 2/1997 | ........... G06F/9/455 |
|---|---|---|---|
| WO | WO98/02821 | 1/1998 | ........... G06F/13/00 |

OTHER PUBLICATIONS

O. Ibe. Essentials of ATM Networks and Services. 1997 Addison–Wesley. pp. 105–113.*

Simpson, W., "IP in IP Tunneling", Request for Comments #153, Oct. 1995, 9 pages.

(List continued on next page.)

Primary Examiner—Hassan Kizou
Assistant Examiner—Joe Logsdon
(74) Attorney, Agent, or Firm—Howard Zaretsky (57) ABSTRACT

An apparatus for and method of enabling the debugging and testing of complex multilevel PNNI based ATM networks. The invention has applications in networks wherein one or more nodes implement only the Minimum Function PNNI implementation and wherein these modes must operate correctly in a PNNI hierarchy environment. A plurality of PTSEs representing simulated virtual portions of an ATM network are injected into a node under test. The PTSEs represent hierarchical portions of ATM networks that are difficult or impossible to implement. The virtual portions of the networks may or may not have been able to be created using real physical network elements. The method includes first generating the injection file containing all the PTSEs to be simulated and then injecting this file into the node under test. The injection process includes reading the ASCII file, parsing the contents and constructing the topology database by processing the binary version of the contents using already existing PNNI processing routines in the switch.

9 Claims, 6 Drawing Sheets

U.S. PATENT DOCUMENTS

| | | | |
|---|---|---|---|
| 5,329,527 A | | 7/1994 | Ujihashi et al. |
| 5,329,619 A | | 7/1994 | Page et al. .................. 395/200 |
| 5,345,558 A | | 9/1994 | Opher et al. ................ 395/200 |
| 5,390,184 A | | 2/1995 | Morris |
| 5,394,402 A | | 2/1995 | Ross |
| 5,408,469 A | | 4/1995 | Opher et al. |
| 5,444,702 A | | 8/1995 | Burnett et al. |
| 5,483,536 A | | 1/1996 | Gunji et al. |
| 5,519,704 A | | 5/1996 | Farinacci et al. |
| 5,548,646 A | | 8/1996 | Aziz et al. ..................... 380/23 |
| 5,548,723 A | | 8/1996 | Pettus .................. 395/200.01 |
| 5,550,816 A | | 8/1996 | Hardwick et al. |
| 5,550,818 A | | 8/1996 | Brackett et al. |
| 5,566,014 A | | 10/1996 | Glance ....................... 359/124 |
| 5,583,865 A | | 12/1996 | Esaki et al. .................. 370/397 |
| 5,600,644 A | | 2/1997 | Chang et al. ............... 370/404 |
| 5,633,869 A | | 5/1997 | Burnett et al. .............. 370/396 |
| 5,659,542 A | | 8/1997 | Bell et al. .................... 370/496 |
| 5,664,170 A | * | 9/1997 | Taylor ..................... 395/200.5 |
| 5,666,487 A | | 9/1997 | Goodman et al. ..... 395/200.76 |
| 5,682,479 A | * | 10/1997 | Newhall et al. ........ 395/200.15 |
| 5,794,128 A | * | 8/1998 | Brockel et al. ............. 455/67.1 |
| 5,875,177 A | | 2/1999 | Uriu et al. ................... 370/244 |
| 5,887,000 A | | 3/1999 | Adachi et al. ............. 371/20.1 |
| 5,907,696 A | * | 5/1999 | Stilwell et al. ............. 395/500 |
| 5,933,475 A | | 8/1999 | Coleman ....................... 379/1 |
| 6,055,561 A | * | 4/2000 | Feldman et al. ............ 709/200 |
| 6,069,889 A | * | 5/2000 | Feldman et al. ............ 370/351 |
| 6,108,309 A | * | 8/2000 | Cohoe et al. ............... 370/241 |
| 6,115,753 A | * | 9/2000 | Joens ......................... 709/242 |
| 6,130,889 A | * | 10/2000 | Feldman et al. ............ 370/397 |
| 6,148,000 A | * | 11/2000 | Feldman et al. ............ 370/397 |

OTHER PUBLICATIONS

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

APPARATUS FOR AND METHOD OF TESTING A HIERARCHICAL PNNI BASED ATM NETWORK

FIELD OF THE INVENTION

The present invention relates generally to data communication networks and more particularly relates to an apparatus for and a method of testing low level PNNI software in an ATM network.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between it and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-tomultipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello message are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PFSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort that is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels are includes in the database summary. The PTSP and PTSE header information of each such PTSE is listed in one of the node's database packets. PTSEs for which new instances are received after the exchanging status has been entered may not be included in any database summary packet since they will be handled by normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet that contains one or more entries from the PTSE request list. The PTSE request list packets are only sent during the Exchanging state and the Loading state. The node can send a PTSE request packet to a neighboring peer and optionally to any other neighboring peers that are also in either the Exchanging state or the Loading state and whose database summary indicates that they have the missing PTSEs.

Received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list have been received, the node moves from the Loading state to the Full state. Once the Full state has been reached, the node has received all PTSEs known to be available from its neighboring peer and links to the neighboring peer can now be advertised within PTSEs.

IISP

IISP is a method of routing and performing auto registration (auto configuration) in an ATM network. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and an associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

In the address prefix exchange method, each node discovers who its neighbors are. This is accomplished by each node sending out on all its NNI ports an identification message that comprises the address prefix assigned to it and its significant length. This message is sent out periodically (e.g., every second). The nodes that receive it compare the address prefix in the message to the special NNI type address that is registered on the port the message was received on. If the addresses do not match or there is no NNI address registered, then the node makes the received address prefix the new registered NNI address for that port and changes its routing tables accordingly. If the addresses do match, the message is ignored.

Sending out identification messages on a periodic basis enables a node to detect almost immediately if it becomes connected to a new neighbor. If a change is detected, the node's modifies its routing tables accordingly. In addition, since each node address prefix is unique and is assigned in hierarchical fashion as described above, it is guaranteed that either the local address prefix (i.e., the address prefix of the node itself) or the remote node address prefix will be smaller.

The IISP signaling specification requires that one side of a link be designated as the USER and the other side as the NETWORK. In networks constructed in accordance with the present invention, on NNI links, if the significant length of the local prefix (i.e., of the node itself) is shorter than that of a neighbor, then the local side is set as the NETWORK. This particular link attribute setting allows the signaling to automatic align after a dynamic link replacement when a node's neighbors are changed.

Thus, the automatic exchange of network address prefixes causes the routing tables of each node to be updated and permits the signaling to 'come up'. This is in contrast to IISP Phase 0 which requires that link attributes be set manually. This method is thus especially advantageous in large networks consisting of more than two nodes.

As an alternative to the automatic exchange of network addresses, the transfer of addresses can be performed manually at each node or can be performed in accordance with ILMI registration procedures.

Note that the above described PNNI and IISP routing schemes are inherently different. In PNNI only full address matching is permitted, i.e., an address must fully match the address entry in the topology database. In contrast, IISP permits partial address matching. The IISP routing method is a partially static routing scheme.

In addition, there are many ATM switches currently in operation that support only the IISP type routing. It is desirable to permit the owners of many of these older ATM switches to upgrade their switches to the more modern PNNI type routing. Upgrades can be performed by upgrading the operating software within the switches. In order to permit upgraded nodes to operate in a PNNI network, the upgraded switches can only support a minimal PNNI configuration. This means that the hierarchical features of PNNI are not supported. More specifically, in a minimal subset of PNNI, a node cannot function as a border node or as a Peer Group Leader (PGL). A border node is a node that has a link to another peer group and executes a special finite state machine (FSM). The PGL is the node that represents the whole peer group and functions as the key component for building large hierarchical networks.

A conflict exists, however, since a major benefit of PNNI is its ability to permit network designers to construct large hierarchical networks. Using PNNI, networks can be constructed that comprise peer groups having from dozens to over a hundred nodes. The concept is that many nodes in the same peer group can be represented as one node in a higher level of the hierarchy. Since PNNI utilizes a link state, source routing type routing scheme wherein each node has a view of the entire network, it is the hierarchy that permits the division of the network view into smaller chunks. In PNNI, very large portions of the network comprising a large number of nodes may be viewed by nodes in other peer groups as a single logical node.

PNNI Hierarchy in an ATM Network

Figure 1:
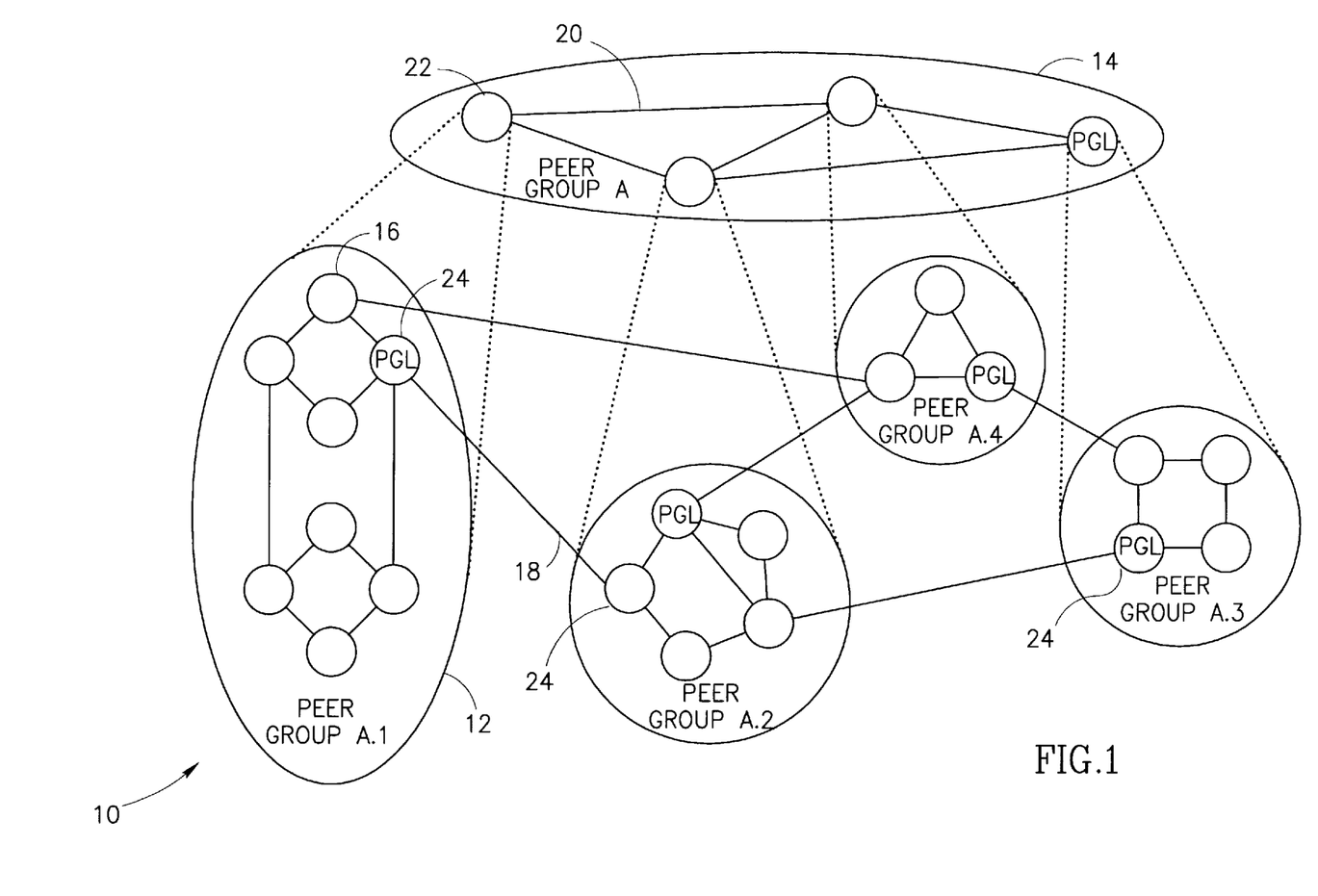
FIG. 1 is a diagram illustrating an example hierarchical PNNI ATM network having a two level hierarchy.

A diagram illustrating an example hierarchical PNNI ATM network having a two level hierarchy is shown in FIG. 1. The example network, generally referenced 10, comprises four peer groups 12 labeled A.1, A.2, A.3 and A.4. Within each peer group 12, are located one or more nodes 16. In each peer group one of the nodes has been elected Peer Group Leader (PGL) as is labeled in FIG. 1. The peer groups 12 are connected together via one or more links 18 connecting the border nodes 24 from each peer group on either side of the link. A logical peer group 14 labeled A has been created comprising four logical group nodes 22. One of the logical group nodes has been elected peer group leader as indicated in FIG. 1. The logical group nodes 22 are connected together via logical links 20. Although only two levels of the PNNI hierarchy are shown, the network 10 can be constructed having any number of nodes and levels.

Those skilled in the ATM network art are familiar with the Private Network to Network Interface (PNNI) routing protocol, an advanced routing protocol for use in current and future ATM networks. The latest PNNI specification is described in the ATM Forum standard "Private Network to Network Interface Specification Version 1.0," March 1996 (PNNI 1.0). This protocol is a relatively complex protocol both from an implementation perspective as well as from a testing perspective. Most realizations of the PNNI protocol to date implement only the mandatory portion of the standard known as the "Minimum Function" subset. The Minimum Function subset implements only the behavior of a "lowest Level Node". Such a node can operate only in a single Peer Group and has the following restrictions:

1. Cannot function as a border node;
2. Cannot instantiate logical nodes;
3. Cannot be a peer group leader;

A difficulty arises in the case where a node with a Minimum Function PNNI implementation must operate correctly with other nodes in a hierarchical environment that have implemented the PNNI hierarchy. Since a Minimum Function node cannot function in a hierarchical environment, it becomes very difficult to test and debug such nodes to ensure their operation in environments where there are nodes that do implement the PNNI hierarchy.

SUMMARY OF THE INVENTION

The present invention is an apparatus for and method for enabling the debugging and testing of complex multilevel PNNI based ATM networks. The invention has applications in networks wherein one or more nodes implement only the Minimum Function PNNI implementation and wherein these nodes must operate correctly in a PNNI hierarchy environment. The method comprises injecting a plurality of PTSEs representing simulated virtual portions of an ATM network. Typically the PTSEs represent hierarchical portions of ATM networks that either could not be implemented or could be implemented but with great difficulty. The virtual portions of the networks may or may not have been able to be created using real physical network elements.

The method permits dynamic debugging of various network configurations and also permits testing such things as the validity of call routing decisions as well as checking implementation functionality in very large network environments. The method does not impose any practical limitations or restrictions on the number of hierarchical levels, the number of nodes in each level or the number of peer groups. In fact, the PTSE injection method of the present invention can be used to test the behavior of a node when an overload occurs in its database.

A major advantage of the method of the present invention is that compared to a full simulation testing process, the method provides for the system under test to execute the complete device software on a real physical device as opposed to a completely simulated network hosted by a computer platform. A fully simulated testing process, by definition, cannot accurately represent a real network system.

The invention comprises first generating the injection file containing all the PTSEs to be simulated and then injecting this file into the node under test. The injection file comprises an ASCII file containing repeating records consisting of the Originating Node ID, Peer Group ID and the body of the PTSE.

The injection process comprises reading the ASCII file, parsing the contents and constructing the topology database by processing the binary version of the contents using already existing PNNI processing routines in the switch.

There is provided in accordance with the present invention, in a Private Network to Network Interface (PNNI) based Asynchronous Transfer Mode (ATM) network, a method of simulating a virtual ATM network coupled to a real portion consisting of a plurality of real nodes, the method comprising the steps of generating a plurality of PNNI Topology State Elements (PTSEs) representing a combination of network elements that function to form the virtual network and injecting the plurality of PTSEs into one of the real nodes designated the node under test, the node under test being part of a real portion of the ATM network which, in combination with the virtual portion, make up the ATM network being tested.

The step of generating comprises the steps of preparing the plurality of PTSEs representing a network configuration corresponding to the virtual network to be simulated and creating an injection output file from the plurality of PTSEs.

The injection output file comprises American Standard Code for Information Interchange (ASCII) characters and comprises repeating records consisting of Originating Node ID, Peer Group ID and PTSE body.

The step of generating comprises the steps of preparing the plurality of PTSEs representing a network configuration corresponding to the virtual network to be simulated, wherein the following input parameters are utilized: Peer Group ATM prefix, number of nodes in the virtual network, number of links per node in the virtual network, base PNNI level in the virtual network and first suffix used for constructing a node's ATM address and creating an injection output file from the plurality of PTSEs.

The step of injecting comprises the steps of reading the plurality of PTSEs into the node under test, parsing the plurality of PTSEs and building a plurality of corresponding binary PTSEs therefrom, processing the plurality of binary PTSEs utilizing software routines within the node under test, inserting PTSE based data into a topology database maintained within the node under test and modifying local PTSE generation so as to generate a PTSE describing a simulated link from the node under test to a node in the virtual portion of the network.

The method further comprises the step of generating a plurality of PTSEs for each desired level of hierarchy. The step of injecting comprises the step of utilizing a local PTSE generation process within one of the node under test in combination with special instruction operative to indicate the presence of a simulated virtual network to the node under test.

There is also provided in accordance with the present invention, in a Private Network to Network Interface (PNNI) based Asynchronous Transfer Mode (ATM) network, a method of simulating a virtual ATM network coupled to a real portion consisting of a plurality of real nodes, the method comprising the steps of generating a plurality of PNNI Topology State Elements (PTSEs) representing a combination of network elements that function to form the virtual network, injecting the plurality of PTSEs into one of the real nodes designated the node under test, the node under test being part of a real portion of the ATM network which, in combination with the virtual portion, make up the ATM network being tested and forming a peer group consisting of a plurality of real nodes making up the real portion and a plurality of logical nodes making up a virtual portion of the peer group, one or more real nodes in the real portion connected to one or more logical nodes in the virtual portion via one or more virtual links, wherein at least one virtual node functions as a border node and at least one virtual node functions as peer group leader of the peer group.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|------|------------|
| ANSI | American National Standards Institute |
| ASCII | American Standard Code Information Interchange |
| ATM | Asynchronous Transfer Mode |
| CCITT | Comite Consulatif International Telegraphique et Telephonique |
| DTL | Designated Transit List |
| E-IISP | Enhanced-Interim Inter-Switch Signaling Protocol |
| FDDI | Fiber Distributed Data Interface |
| FSM | Finite State Machine |
| IISP | Interim Inter-Switch Signaling Protocol |
| ITU | International Telecommunications Union |
| LEC | LAN Emulation Client |
| LES | LAN Emulation Server |
| OSPF | Open Shortest Path First |
| PC | Personal Computer |
| PGL | Peer Group Leader |
| PNNI | Private Network to Network Interface |
| PTSE | PNNI Topology State Element |
| PTSP | PNNI Topology State Packet |
| RCC | Routing Control Channel |
| UNI | User to Network Interface |
| VCC | Virtual Channel Connection |

General Description

The present invention is an apparatus for and method for enabling the debugging and testing of complex multilevel PNNI based ATM networks. The invention has applications in networks wherein one or more nodes implement only the Minimum Function PNNI implementation and wherein these modes must operate correctly in a PNNI hierarchy environment. The method comprises injecting a plurality of PTSEs representing simulated virtual portions of an ATM network. Typically the PTSEs represent hierarchical portions of ATM networks that either could not be implemented or could be implemented but with great difficulty. The virtual portions of the networks may or may not have been able to be created using real physical network elements.

The method permits dynamic debugging of various network configurations and also permits testing such things as the validity of call routing decisions as well as checking implementation functionality in very large network environments. The method does not impose any practical limitations or restrictions on the number of hierarchical levels, the number of nodes in each level or the number of peer groups. In fact, the PTSE injection method of the present invention can be used to test the behavior of a node when an overload occurs in its database.

A major advantage of the method of the present invention is that compared to a full simulation testing process, the method permits the system under test to execute the complete device software on a real physical device as opposed to a completely simulated network hosted on a computer platform. A fully simulated testing process, by definition, cannot accurately represent a real network system.

Figure 2:
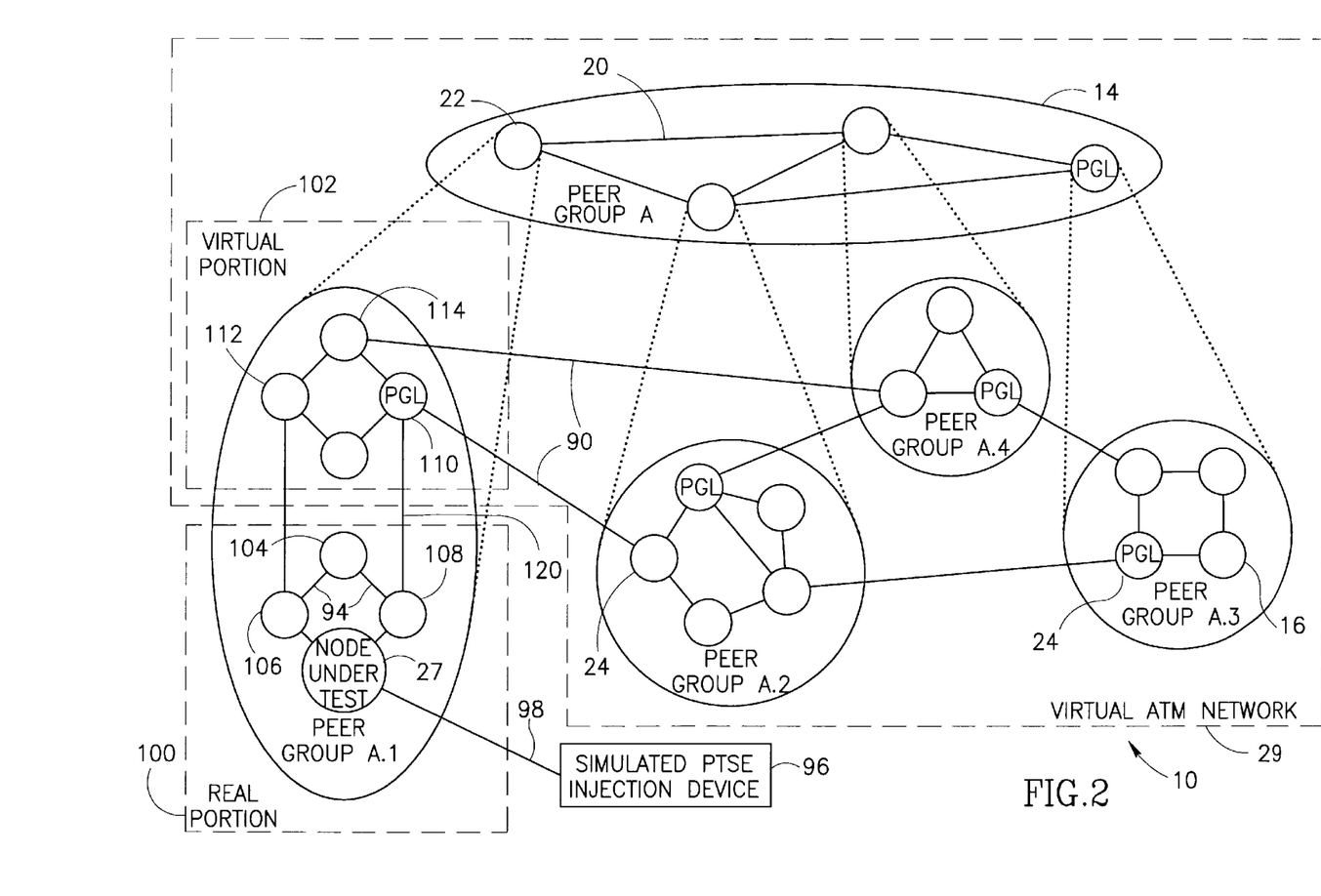
FIG. 2 is a diagram illustrating the example hierarchical PNNI ATM network of FIG. 1 divided into a real physical portion and a simulated virtual portion.

A diagram illustrating the example hierarchical PNNI ATM network of FIG. 1 divided into a real physical portion and a simulated virtual portion is shown in FIG. 2. The example ATM network 10 is identical to that of FIG. 1. The difference, however, is that a portion 29 of the network has been simulated using the method of the present invention. A PTSE injection device 96 is connected via any suitable communication link 98 such as a serial link, e.g., RS-232, to the node under test 27. The peer group A.1 is divided into a real or physical portion 100 and a virtual portion 102. The other peer groups A.2, A.3, A.4 and the higher level logical peer group 14 are simulated virtually as a collection of PTSEs that are injected into the node under test 27.

Note that in implementing the communications link between the node under test and the simulated PTSE injection device, the switches (nodes) may or may not need to be modified to accept data from one or more alternate sources, e.g., serial ports, parallel ports, the Internet, etc. rather than from more traditional links, e.g., OC-3, OC-12, DS-3, etc. Most commercially available switches comprise one or serial ports, e.g., RS-232 ports, on their front panels for console/control connections and for debugging and testing purposes.

The real portion of the network makes up a part of Peer Group A.1 with the other part of Peer Group A.1 and the other peer groups A.2, A.3, A.4 and logical higher level logical peer group 14 simulated virtually as a collection of PTSEs that are injected into the node under test 27. The real portion 100 of Peer Group A.1 comprises four physical nodes 27, 104, 106 and 108. The node under test 27 and node 104 are standard nodes that do not require modification for purposes of the invention. The only requirement is that node 27 comprises communication means for receiving the injection output file from the simulated PTSE injection device 96. As stated previously, this is already built into most available ATM switches. Nodes 106 and 108, however, must be modified so as to locally generate the simulated link to the virtual portion 102 of the Peer Group A.1.

The virtual portion 102 comprises four logical nodes. Nodes 110, 112 are connected by virtual links 120 to nodes 108, 106, respectively. Logical node 114 is connected to other peer groups via logical links 90.

It is important to note that since the physical nodes 27, 104, 106, 108 cannot be peer group leaders or border nodes, it is mandatory that the Peer Group A.1 comprise at least one logical node to function as a PGL and a border node to permit connections to other peer groups. Thus, Peer Group A.1 comprises a physical (real) portion and a virtual portion.

Communication links 90 connect the virtual peer groups to each other and to the real peer group 100. Real physical communication links 94 connect the real nodes together.

PTSE Testing Method

Figure 3:
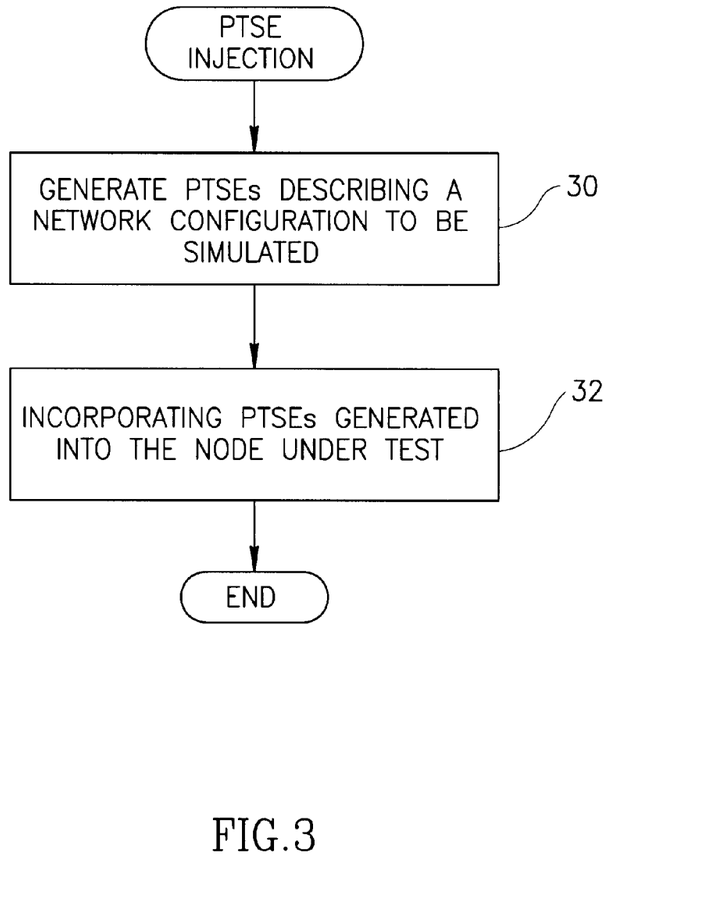
FIG. 3 is a flow diagram illustrating the PTSE injection method of the present invention.

A flow diagram illustrating the PTSE injection method of the present invention is shown in FIG. 3. The PTSE injection method of debugging and testing a hierarchical PNNI software implementation comprises two stages. The first stage comprises generating the PTSEs describing the network configuration to be simulated (step 30). During this stage, the network configuration generated is written to a file preferably using a standard format such as ASCII The second stage is to incorporate the generated PTSEs into the node under test (step 32). In the second stage, the ASCII file generated previously is input at run time into the node under test which then processes the injected PTSEs using standard PNNI software already present in the node. Thus, the PTSEs are processed as if they had actually been received from another node over a communications link.

The first stage can be performed on a standard PC utilizing standard PC file generation and coding tools such as Microsoft Visual C++. Performing the second stage, however, requires minor additions to the PNNI software already running in the switch. The additions are needed in order to carry out some relatively simple functions as will now be described.

PTSE Injection Process

Figure 4:
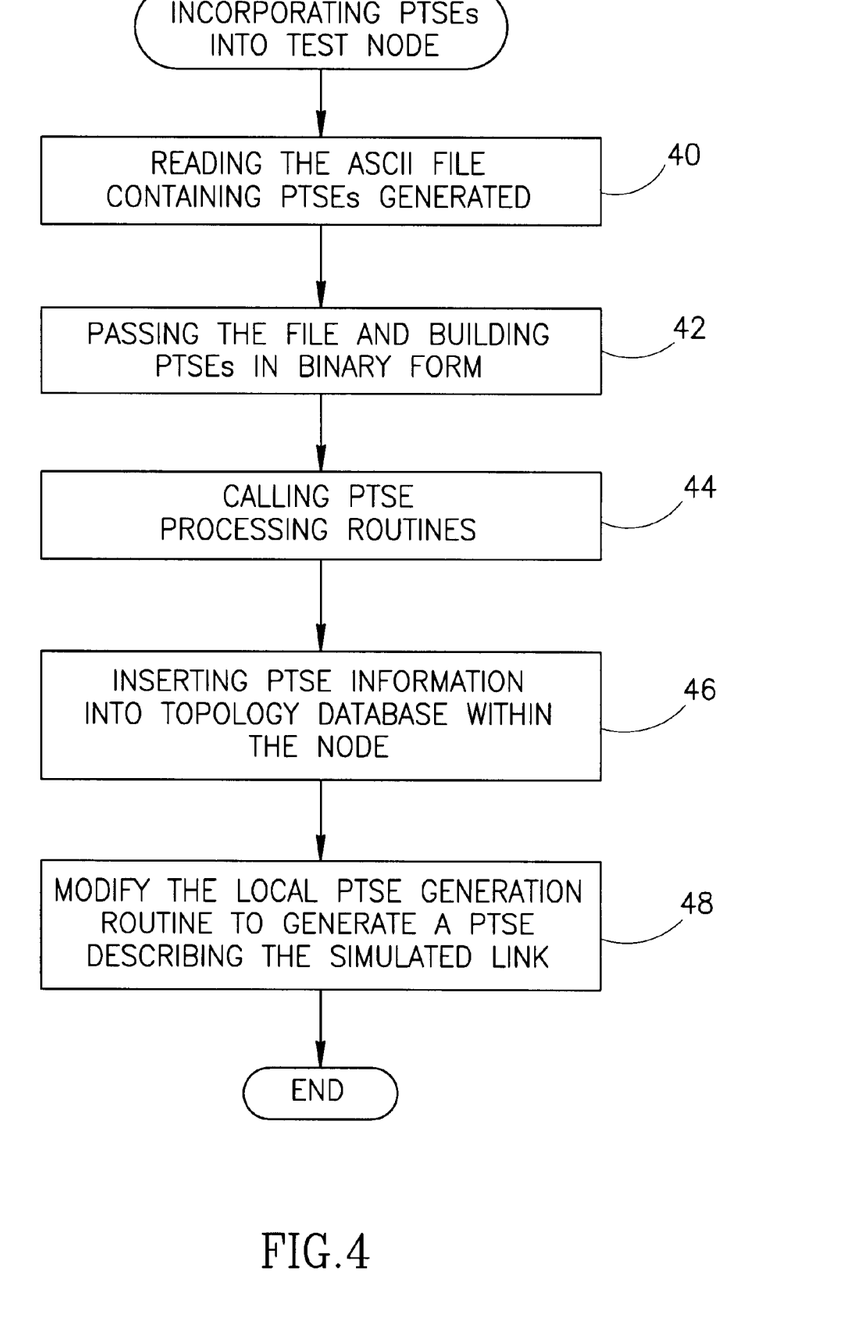
FIG. 4 is a flow diagram illustrating the PTSE node incorporation method in more detail.

A flow diagram illustrating the PTSE node incorporation method in more detail is shown in FIG. 4. The first step in incorporating the PTSEs into the node under test is to read the ASCII file containing PTSEs generated during stage one above (step 40). Next, the node parses the file read and builds PTSEs in binary form (step 42). Note that the PTSEs typically are represented in binary form within the switches. The PTSE generation process functions to generate the file preferably in human readable form, thus necessitating the parsing and conversion. Alternatively, a file comprising the simulated PTSEs can be generated in binary form without departing from the spirit of the invention.

The next step is to call the various PTSE processing routines present in the typical switch for processing the now parsed PTSEs that together simulate a portion of an ATM network (step 44). During the processing stage, the PTSE information is inserted into the topology database stored within the node (step 46). Next, the local PTSE generation routine is modified to cause the node to generate a PTSE describing the simulated link 120 (FIG. 2) connecting the real PNNI node to a logical node in the virtual portion of the network.

PTSE Generation Process

It is noted that generating the injection file using standard ASCII characters has several advantages, several of which are described below. First, such a file permits the developer to view, verify, edit and change the order of PTSEs to be injected into the real node under test. Second, the file permits the ability to build PTSEs of maximum length that is relatively difficult using conventional test equipment. Third, the file permits the ability to create PTSEs having intentional errors for the purpose of testing the stability of the PNNI software. Forth, the file permits the ability to create PTSEs that represent nodes in different Peer Groups at different levels.

As an example, the first stage, i.e., generation of the simulated PTSEs to be injected, can be performed using commercially available Microsoft Visual C++ from their Developer Studio product. One skilled in the can easily write the software to generate the simulated PTSEs. The software functions to generate all the PTSEs required to represent all the peer groups having the necessary number of nodes and number of links per node in accordance with the virtual network to be simulated. The following input parameters are used to generate the PTSEs using the software in the simulated PTSE injection device 96 (FIG. 2).

Figure 5:
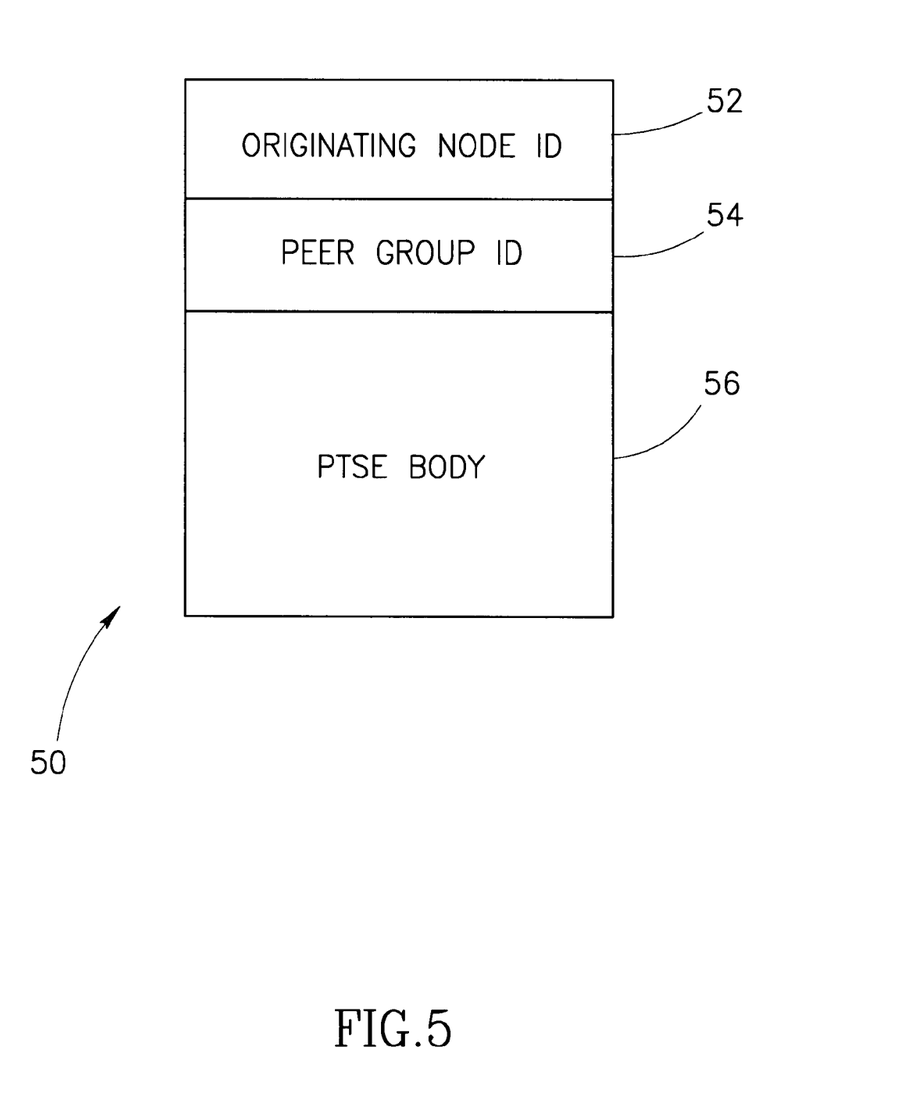
FIG. 5 is a diagram illustrating the record that is repeated in the injection output file.

1. Peer Group ATM address prefix;
2. Number of nodes in the simulated ATM network;

3. Number of links per node;

4. Base PNNI level (needed if the simulated network will be used in a multilevel environment);

5. First suffix used for constructing the ATM addresses for the nodes;

In addition, all PTSEs injected into the real PNNI node under test, must have the following identification parameters:

1. Peer Group ID;
2. Origination Node ID;
3. PTSE ID;
4. PTSE Sequence Number;
5. PTSE type—one of the following:
   a) nodal information that describes the node type and its summary information;
   b) horizontal link that describes all incoming and outgoing communication links with neighbors, i.e., the network topology;
   c) summary address information that comprises ATM information advertised by each node (not mandatory);

The PTSE injection output file generated comprises three types of records-that repeat throughout the file. A diagram illustrating the record types making up the injection output file is shown in FIG. 5. The records, generally referenced 50, comprise an Originating Node ID 52, Peer Group ID 54 and the body of the PTSE itself 56. These three record types are repeated throughout the injection file.

During the first stage described above (step 30 of FIG. 3), the generation process is repeated for each level of the hierarchy to be simulated, thus resulting in numerous intermediate injection output files. All the intermediate injection files are merged into a single injection file. Connections, i.e., links, between levels can be configured either manually or generated automatically during the merge process by marking the nodes, via software, that are to have simulated uplinks, i.e., links from lower levels to upper levels.

Once the injection file is complete, it is inserted or injected into the node under test using the method of FIG. 4. With reference to FIG. 4, the file is first generated then written to the node under test that parses the contents of the file. PTSEs are built in binary form, including checksums, and then processed using the routines normally responsible for processing PTSEs when received over a link from other nodes. The processed data is written to the node's topology database. Finally, the results of the subsequent flooding and routing processes as well as the statistics are analyzed and verified to ensure correct operation of the network.

An Illustrative Example

Figure 6:
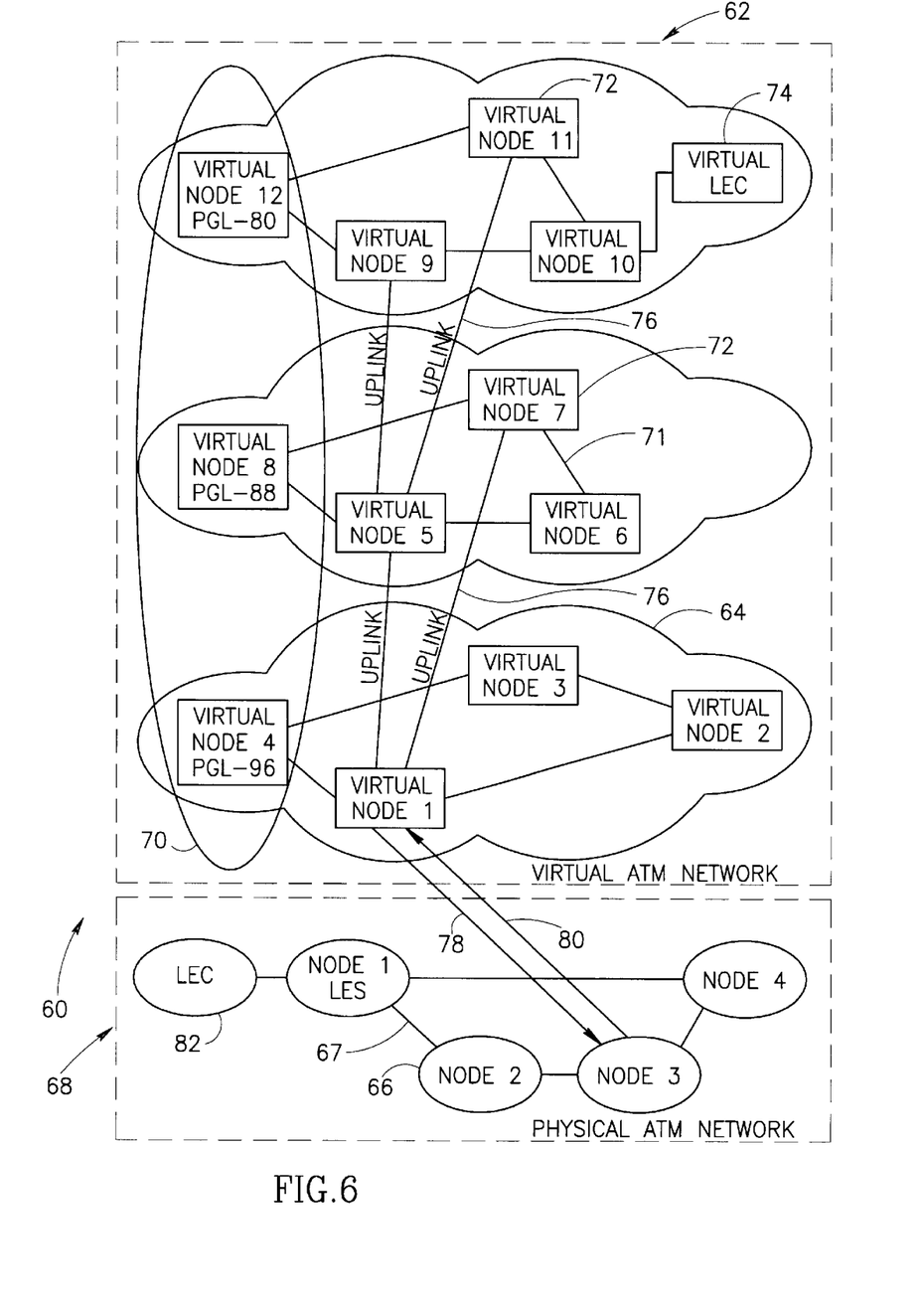
FIG. 6 is a network diagram illustrating an example virtual hierarchical PNNI ATM network that is simulated and injected into the test node to aid in testing and debugging.

A network diagram illustrating an example virtual hierarchical PNNI ATM network that is simulated and injected into the test node to aid in testing and debugging is shown in FIG. 6. The network, generally referenced 60, comprises a real physical network portion 68 at level 96 and a virtual simulated portion 62 having multiple levels of hierarchy. The network 60 is a three level ATM network generated using the method of the present invention.

The real portion 68 comprises a plurality of real nodes 66 labeled Node 1 through Node 4 that are connected by real links 67. Node 1 is running a LAN Emulation Service (LES) and is connected to an edge device LAN Emulation Client (LEC) 82. The virtual injected portion 62 comprises 12 virtual nodes grouped as three virtual networks 64 at level 96, level 88 and level 80 connected together by virtual uplinks 76. Each virtual network comprises a plurality of virtual nodes 72, labeled Virtual Node 1 through Virtual Node 12, connected together via virtual links 71. A virtual LEC 74 is shown connected to Virtual Node 10. In addition, Virtual Nodes 4, 8 and 12 are combined to form a logical complex node 70. These three virtual nodes are also the Peer Group Leaders in each of the levels 96, 88, 80, respectively.

To 'connect' the virtual network to the physical one, a special PTSE containing information about the link from Virtual Node 1 to real Node 3 was generated and injected into Node 3 (the node under test). As all links participating in PNNI are bidirectional, there is required to be a link in the opposite direction. This link, from physical Node 3 to Virtual Node 1, uses the local PTSE generation process in physical Node 3 via a special instruction that indicates the presence of a simulated network. The special instruction can be hard coded into the compiled code such as via a compiler directive to allow the switch to be configured properly at turn on time, i.e., fooling Node 3 that a PTSE was successively sent to the virtual network.

The link 78 from Virtual Node 1 to real Node 3 is simulated as one of the simulated virtual links injected into Node 3. Note that although the simulated PTSE injection device is not shown, it is assumed that the file of generated PTSEs has already been injected into Node 3. The reverse link 80, however, cannot be injected with the other simulated PTSEs as this PTSE is a function of an act on the part of Node 3 itself. In operation, Node 3 transmits a PTSE advertising its link to its neighbor (i.e. Virtual Node 1 in this case) and in response to the reply, it opens up the link for traffic. Thus, the PNNI software within Node 3 must be modified as described above to automatically generate the necessary PTSEs and/or other entries in its topology database to simulate the existence of link 80.

Once one of the nodes in the real portion is injected with the simulated network, the other nodes in the real network soon learn about it via the normal process of flooding.

Using the PNNI configuration shown in FIG. 6, the following relatively complex PNNI scenarios can be tested:
1. the resolution of conflicting PTSEs, i.e., when a originating (virtual) node sends PTSEs with different information but with the same identification information, both in a single peer group and in a multilevel network;
2. crankback processing in a multilevel network
3. building Designated Transmit Lists (DTLs) in a multilevel network, etc.

In addition, another use for the example network 60 shown is to simulate the operation of two LECs connected to a LES. The LES running on Node 1 has a first LEC attached to it and a second virtual LEC 74 attached to Virtual Node 10. Thus, this example virtual network is useful in testing, among other things, the proper construction of a DTL from the LES to the virtual LEC 74.

While the invention has been described with respect to a limited number of embodiments, it will be appreciated that many variations, modifications and other applications of the invention may be made.

What is claimed is:

1. In a Private Network to Network Interface (PNNI) based Asynchronous Transfer Mode (ATM) network, a method of simulating a virtual ATM network coupled to a real portion comprising a plurality of real nodes, said method comprising the steps of:

generating a plurality of PNNI Topology State Elements (PTSEs) representing a combination of network elements that function to form said virtual network; and injecting said plurality of PTSEs into one of said real nodes designated the node under test.

2. The method according to claim 1, wherein said step of generating comprises the steps of:

preparing said plurality of PTSEs representing a network configuration corresponding to said virtual network to be simulated; and creating an injection output file from said plurality of PTSEs.

3. The method according to claim 2, wherein said injection output file comprises American Standard Code for Information Interchange (ASCII) characters.

4. The method according to claim 2, wherein said injection output file comprises repeating records consisting of Originating Node ID, Peer Group ID and PTSE body.

5. The method according to claim 1, wherein said step of generating comprises the steps of:

preparing said plurality of PTSEs representing a network configuration corresponding to said virtual network to be simulated, wherein the following input parameters are utilized: Peer Group ATM prefix, number of nodes in said virtual network, number of links per node in said virtual network, base PNNI level in said virtual network and first suffix used for constructing a node's ATM address; and creating an injection output file from said plurality of PTSEs.

6. The method according to claim 1, wherein said step of injecting comprises the steps of:

reading said plurality of PTSEs into said node under test;

parsing said plurality of PTSEs and building a plurality of corresponding binary PTSEs therefrom;

processing said plurality of binary PTSEs utilizing software routines within said node under test;

inserting PTSE based data into a topology database maintained within said node under test; and modifying local PTSE generation so as to generate a PTSE describing a simulated link from said node under test to a node in said virtual network.

7. The method according to claim 1, further comprising the step of generating a plurality of PTSEs for each desired level of hierarchy.

8. The method according to claim 1, wherein said step of injecting comprises the step of utilizing a local PTSE generation process within one of said real nodes in combination with a special instruction operative to indicate the presence of a simulated virtual network to said node under test.

9. In a Private Network to Network Interface (PNNI) based Asynchronous Transfer Mode (ATM) network, a method of simulating a virtual ATM network coupled to a real portion comprising a plurality of real nodes, said method comprising the steps of:

generating a plurality of PNNI Topology State Elements (PTSEs) representing a combination of network elements that function to form said virtual network;

injecting said plurality of PTSEs into one of said real nodes designated the node under test; and forming a peer group consisting of a plurality of real nodes making up said real portion and a plurality of logical nodes making up a virtual portion of said peer group, one or more real nodes in said real portion connected to one or more logical nodes in said virtual portion via one or more virtual links, wherein at least one virtual node functions as a border node and at least one virtual node functions as peer group leader of said peer group.

* * * * *